United States Patent Office 3,255,390
Patented June 7, 1966

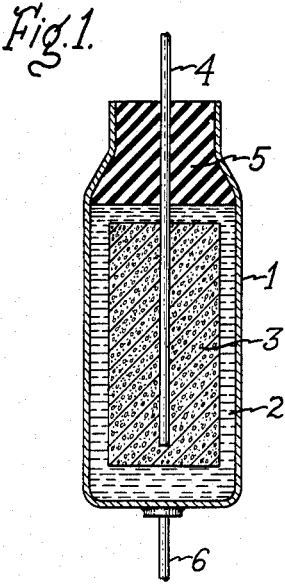
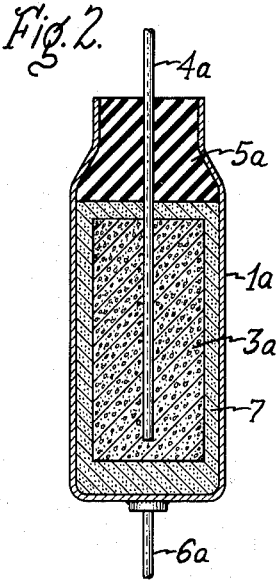
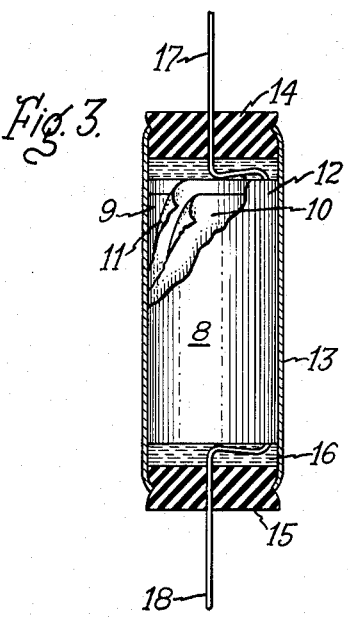

3,255,390
ELECTRICAL CAPACITOR
Ralph A. Ruscetta and Alfred L. Jenny, Columbia, S.C., assignors to General Electric Company, a corporation of New York
Filed June 20, 1962, Ser. No. 203,802
5 Claims. (Cl. 317—230)

The present invention relates to electrical capacitors, and more particularly to improved electrical capacitors incorporating liquid electrolytes.

Conventional electrolytic capacitors of the liquid electrolyte type have certain advantages over known capacitors of the solid electrolyte type. For example, liquid electrolyte capacitors have a self-healing quality whereby during operation the liquid electrolyte can re-form or "heal" portions of the thin anodic dielectric film on the electrode which may have been subject to breakdown. In the case of solid electrolyte capacitors, however, any breakdown of the anodic dielectric film generally causes a short circuit and since there is usually insufficient current available to burn out the failure, the capacitor ceases to operate. On the other hand, conventional liquid electrolyte capacitors in comparison to solid electrolyte capacitors are much more subject to variation in electrical properties, such as capacitance and dissipation factor, over wide changes in temperature, a disadvantage which is magnified as the capacitance per unit volume increases.

It is an object of the invention to provide an improved electrolytic capacitor which has the advantages characterizing both solid and liquid electrolyte types of capacitors but substantially avoids the disadvantages of each.

It is a particular object of the invention to provide an electrolytic capacitor having a composite liquid-solid electrolyte.

It is another object of the invention to provide a liquid electrolyte-containing capacitor characterized by improved stability of capacitance and dissipation factor over temperature extremes.

Other objects and advantages will become apparent from the following description and the appended claims.

With the above objects in view, the present invention relates to an electrical capacitor comprising, in combination, an electrode formed of an anodizable metal having a dielectric film formed thereon, a layer of solid semi-conductive oxide on the dielectric film, a liquid electrolyte in contact with the solid semi-conductive oxide layer, and a second electrode in contact with the liquid electrolyte and spaced thereby from the solid semi-conductive oxide layer.

The invention will be better understood from the following description taken in conjunction with the accompanying drawing in which:

FIGURE 1 shows an electrolytic capacitor of a type in which the invention may be embodied;

FIGURE 2 shows a different type of electrolytic capacitor to which the invention may be applied; and FIGURE 3 shows still another form of capacitor embodying the invention.

Referring now to the drawing, and particularly to FIGURE 1, there is shown an electrolytic capacitor comprising a metal casing 1 serving as the cathode and containing a liquid electrolyte 2 in which an anode 3 of any suitable film forming metal such as tantalum is immersed. Casing 1 may be silver or any metal which does not adversely affect the fill electrolyte or become corroded thereby. Electrolyte 2 may be of conventional composition such as an aqueous ammonium pentaborate-glycol solution which fills the casing and impregnates the anode 3. Examples of other compositions of electrolyte which may be used are 7 to 9 molar aqueous lithium chloride solution, sulfuric acid, and ethylene glycol-water mixtures having any suitable ionogen such as boric acid or borates, acetic acid or acetates, sulfuric acid or sulfates, ammonium nitrate, aluminum nitrate, and other known or suitable electrolyte solutions. In the embodiment shown in FIGURE 1, anode 3 is formed typically of tantalum produced by powder metallurgy techniques, wherein particles of the tantalum are pressed and sintered into a porous compact mass or slug in accordance with known processes to provide a large surface area. A film-forming wire 4 made of tantalum or other film-forming metal is embedded in slug anode 3 and passes to the exterior of casing 1 through an insulating sealing plug 5 around which casing 1 is crimped to provide a fluid-tight enclosure for the capacitor. At the opposite end of the capacitor, a cathode lead 6 is suitably joined by welding or otherwise to the outside of casing 1. If desired, a porous impregnatable spacer (not shown) such as kraft paper or other suitable material may be interposed in the space between anode 3 and casing 1.

In accordance with the invention, anode 3 has an anodically formed dielectric oxide film on the exposed surfaces of the particles forming the mass of the porous electrode body, and a semi-conductive oxide layer is deposited in accordance with known procedures in intimate contact with the thus-formed anodic dielectric film. The production of such porous electrode bodies with superposed films of dielectric oxide and a semi-conductive oxide such as manganese dioxide are already known, and are disclosed in detail, for example, in British Patent 747,051 dated March 28, 1956, and such disclosure is incorporated by reference herein.

A typical process which may be used in preparing anode 3 prior to assembly in the capacitor unit includes compressing and sintering particles of tantalum into a rigid porous mass of cylindrical shape with a tantalum lead wire embedded in one end in the mass. After being cleaned in any conventional manner, the porous electrode is immersed in an anodizing electrolyte, e.g., aqueous solution of acids such as $HNO_3$, $H_3PO_4$, $H_2SO_4$, boric acid, propionic acid, or succinic acid, and subjected to a constant current source of from 5–50 ma./gram formation current and held until the voltage across the electrodes reaches some predetermined value. Then the voltage is held constant and the current is allowed to decrease for a sufficient time to produce thereon an anodic film of tantalum oxide. The film formation is carried out in well known manner until a film of the desired electrical characteristics is obtained. The anodically film-formed electrode is then immersed in an aqeous manganous nitrate solution for impregnating the porous electrode with the latter solution, and sufficient heat, e.g., 290° C., is then applied to pyrolytically decompose the manganous nitrate and convert it in situ to manganese dioxide. The electrode is then subjected to the electrolytic anodizing treatment as before applied for reforming the anodic oxide film on the electrode, and the unit is then reimpregnated with the solution of manganous nitrate and pyrolytically converted as previously described. These steps may be repeated as often as desired. The foregoing steps are accomplished with known procedures and are disclosed, among other places, in the aforementioned British patent.

It has been unexpectedly found that when an anode of the above-described construction is incorporated in a capacitor having a liquid electrolyte to co-act with the solid manganese dioxide electrolyte, markedly improved results in electrical properties, and notably in stability of capacitance and dissipation factor over wide temperature extremes, are obtained.

The following table shows comparative data in terms of stability of capacitance and in dissipation factor obtained with three types of electrolytic capacitors, namely, a solid type such as disclosed in the aforementioned British patent with no liquid electrolyte, a capacitor with a liquid electrolyte but no solid electrolyte, and a capacitor containing a composite solid-liquid electrolyte as shown in the FIGURE 1 embodiment. In the preparation of the units, the anodes were formed to 50 volts D.C. and were then processed as usual for preparing solid electrolyte capacitors. The liquid electrolyte employed was a 7 molar lithium chloride solution, and silver cases were used. The units were then aged at 25° C. and at 85° C. prior to the tests which resulted in the data shown in the table below:

| Type | Temperature, °C. | Percent Capacitance | Percent D.F. |
| --- | --- | --- | --- |
| Solid | 25 | 100 | 1.8 |
| Do | −55 | 96.7 | 2.3 |
| Solid/Liquid | 25 | 100 | 5.3 |
| Do | −55 | 82 | 26.4 |
| Liquid | 25 | 100 | 14.8 |
| Do | −55 | 40 | 79.6 |

As will be seen from the above data, the composite liquid-solid capacitors of the invention in comparison to the liquid-type capacitors provide a more than two-fold increase in the amount of capacitance retained at −55° C., and provide a three-fold decrease in dissipation factor at 25° C. and −55° C. While the capacitance and dissipation factor values of the composite liquid-solid units of the invention are not as favorable as the purely solid type capacitor, the film-healing benefits characterizing the units of the invention makes it possible to operate the capacitors of the invention under conditions under which the solid-type capacitors would break down. It is further to be noted that the value for capacitance retained by the units of the invention is more than half of the variation between the purely liquid and purely solid types, whereas the dissipation factor of the liquid-solid units is less than half of the variation between the respective D.F.'s of the solid and liquid types. These values are particularly unexpected in view of the predominance in terms of weight of the liquid electrolyte over the solid manganese dioxide layer present in the composite electrolyte units.

Further advantages may be produced by a modification of the capacitor, as shown in FIGURE 2. In this embodiment the space between slug anode 3a and casing 1a is filled with packed particles of manganese dioxide as indicated by numeral 7, the packed mass being impregnated with the liquid electrolyte which is introduced into the casing. There is thereby produced an increased surface area provided by the added manganese dioxide particles, and the capacitance produced is thus markedly improved. In a further modification of this unit, the inner surface of casing 1a may be coated with a layer of manganese dioxide to thereby provide better adhesion of the packed manganese dioxide material to the cathode casing. In addition to the increased capacitance provided by the modification shown in FIGURE 2, there is further obtained thereby a thixotropic mixture of the liquid electrolyte and the packed manganese dioxide material which results in a non-leaking electrolyte material, and such benefit is obtained without sacrificing the aforementioned self-healing qualities which characterize liquid electrolyte units.

FIGURE 3 shows another form of capacitor in which the present invention may be embodied, comprising a casing 13 enclosed by insulating plugs 14, 15 and containing liquid electrolyte 16, in which is immersed a wound capacitor section 8. Capacitor roll 8 is formed of a pair of tantalum foils 9, 10 (or other film forming material) having respective leads 17, 18 therefor and interwound with spacer material 11, 12 in which manganese dioxide has been impregnated, as disclosed and claimed in co-pending application Serial No. 187,574, filed in the name of H. Cohn on April 16, 1962 and assigned to the same assignee as the present invention.

Other types of capacitors may also be employed in conjunction with the present invention, such as those employing a wire anode rather than one of a porous anode sintered type as shown in FIGURE 1.

There is thereby provided by the invention, as described above, a improved electrolytic capacitor comprising co-acting electrolytes of ionic and electronic types utilizing the combination of liquid and solid electrolytes, and which provides the self-healing properties of liquid electrolyte capacitors combined with improved stability of capacitance and lower dissipation factor as compared to the usual liquid type capacitors.

While the present invention has been described with reference to particular embodiments thereof, it will be understood that numerous modification may be made by those skilled in the art without actually departing from the scope of the invention. Therefore, the appended claims are intended to cover all such equivalent variations as come within the true spirit and scope of the invention.

What we claim as new and desire to secure by Letters Patent in the United States is:

1. An electrolytic capacitor comprising, in combination, a casing, an electrode in said casing formed of an anodizable metal having a dielectric film formed thereon, an adherent layer of solid semi-conductive oxide formed on said dielectric film, and a film-forming liquid electrolyte in said casing in contact with said solid semi-conductive oxide layer.

2. An electrical capacitor comprising, in combination, a pair of electrodes at least one of which comprises a film-forming metal having a dielectric oxide film formed thereon and an adherent layer of semi-conductive oxide material formed on said dielectric oxide film, and a film-forming liquid electrolyte in contact with said semi-conductive oxide material.

3. An electrical capacitor comprising, in combination, a casing serving as the capacitor cathode, an anode in said casing formed of anodizable metal having a dielectric film formed thereon, an adherent layer of solid semi-conductive oxide formed on said dielectric film, and a film-forming liquid electrolyte in said casing in contact with said solid semi-conductive oxide layer and said cathode casing.

4. An electrical capacitor comprising, in combination, a casing serving as the capacitor cathode, an anode in said casing formed of an anodizable metal having dielectric film formed thereon, an adherent layer of solid semi-conductive oxide material formed on said dielectric film, a mass of solid semi-conductive oxide material in said casing between said layer of solid semi-conductive oxide material and said casing, and a film-forming liquid electrolyte impregnating said mass of semi-conductive oxide material and in contact with said layer of solid semi-conductive oxide material and said cathode casing.

5. An electrical capacitor comprising, in combination, a pair of superposed convolutely wound foil electrodes at least one of which is composed of a film-forming metal having a dielectric oxide film formed thereon, said foil electrodes being separated by spacer material impregnated with a semi-conductive oxide material and arranged in contact with said dielectric film, and a film-forming liquid electrolyte material impregnating said spacer material.

References Cited by the Examiner

UNITED STATES PATENTS

| | | | |
| --- | --- | --- | --- |
| 1,906,691 | 5/1933 | Lilienfeld | 317—230 |
| 1,986,779 | 1/1935 | Lilienfeld | 317—230 |
| 2,005,279 | 6/1935 | Van Geel | 317—230 |
| 2,756,373 | 7/1956 | Hautz et al. | 317—230 |
| 3,036,249 | 5/1962 | Hall | 317—230 |

JOHN W. HUCKERT, *Primary Examiner.*

JAMES D. KALLAM, *Examiner.*